March 26, 1940.   J. B. O'CONNOR   2,195,223
LOCKING DEVICE
Filed Dec. 12, 1936   4 Sheets-Sheet 1
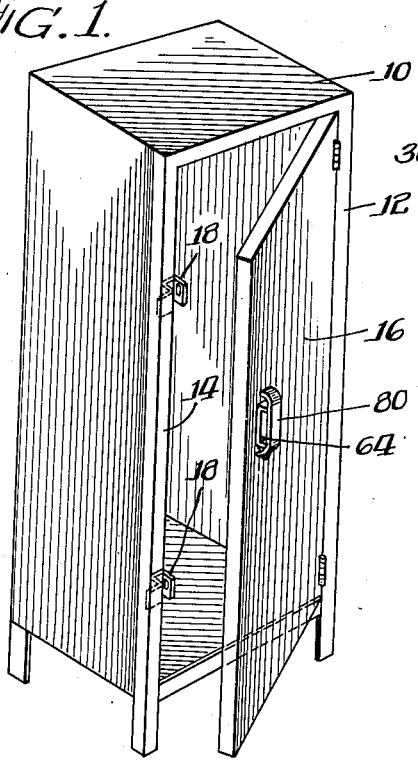
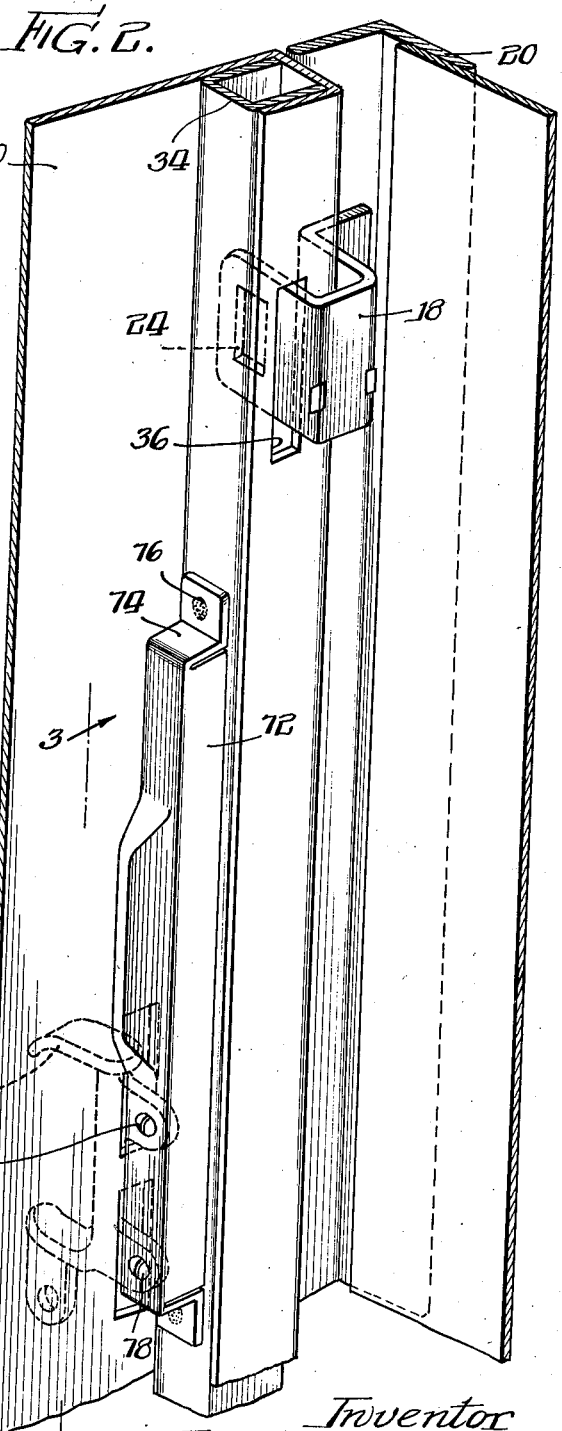
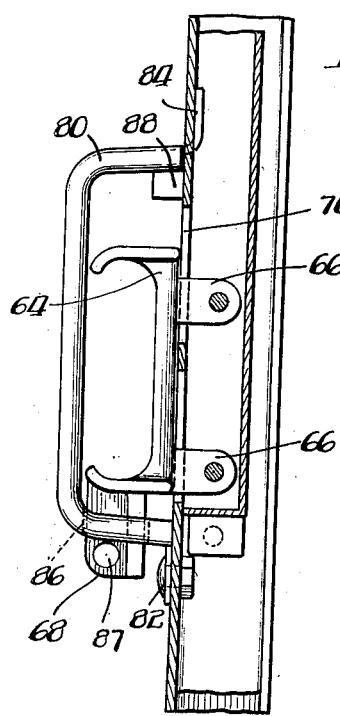
Inventor
John B. O'Connor
By: Cox & Moore
attys.

March 26, 1940.  J. B. O'CONNOR  2,195,223
LOCKING DEVICE
Filed Dec. 12, 1936  4 Sheets-Sheet 2
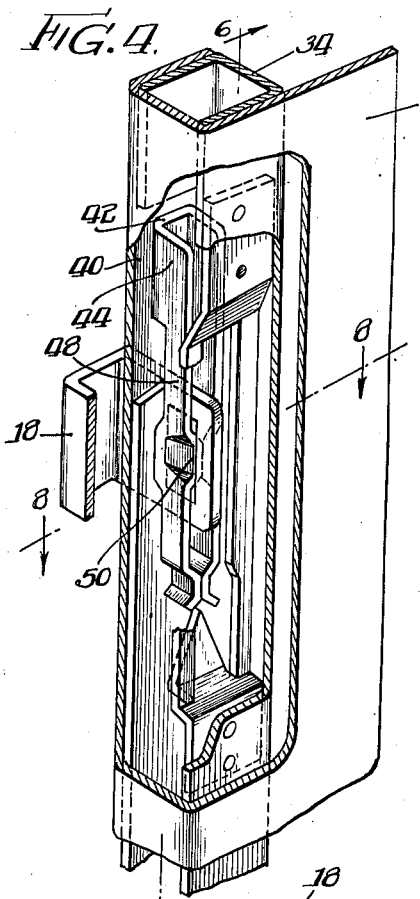
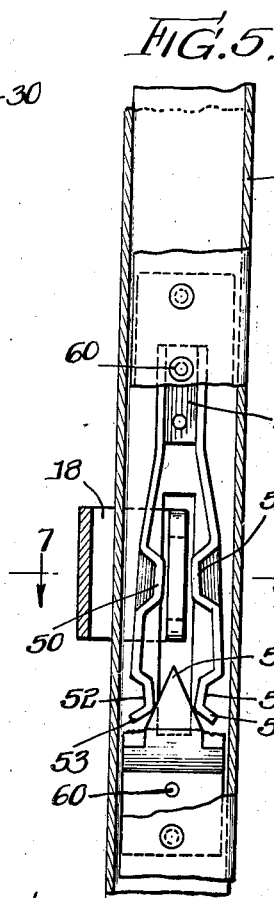
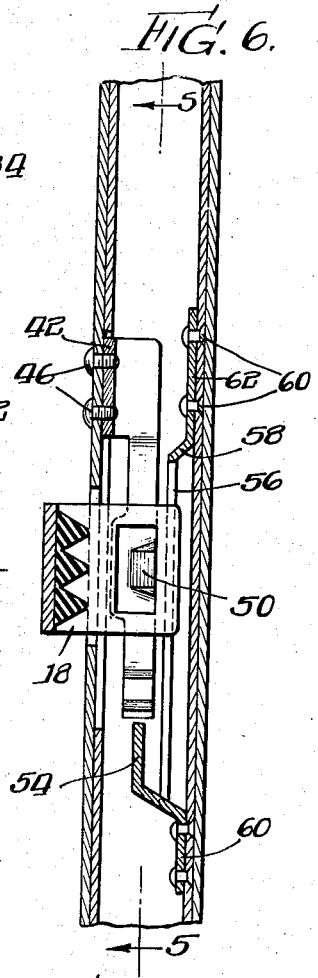
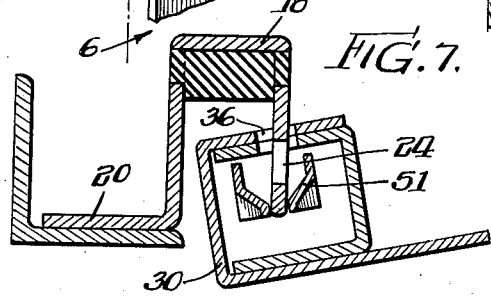
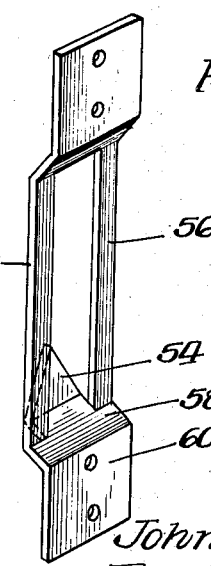
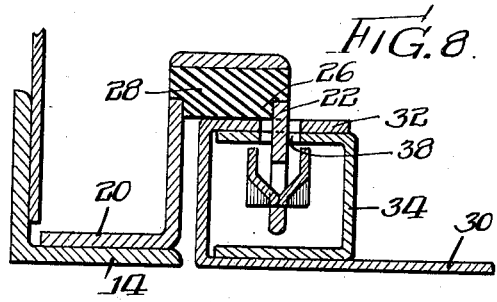
Inventor
John B. O'Connor
By: Cox & Moore, attys.

March 26, 1940. J. B. O'CONNOR 2,195,223
LOCKING DEVICE
Filed Dec. 12, 1936 4 Sheets-Sheet 3
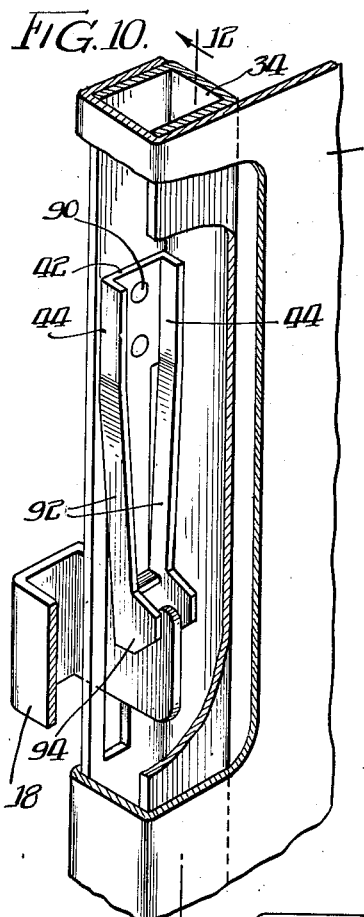
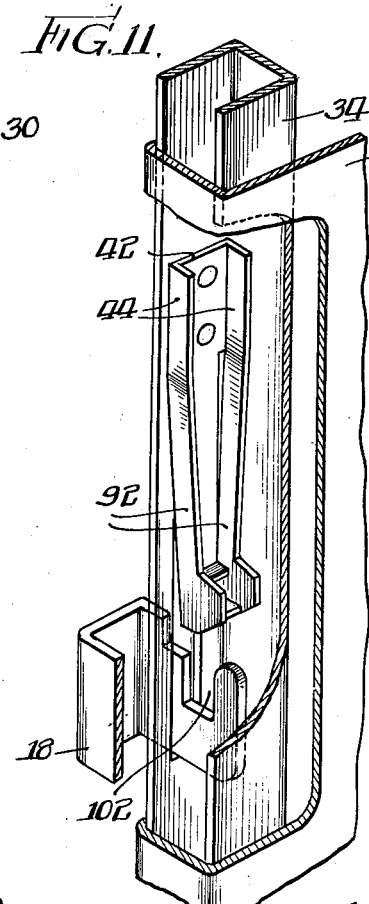
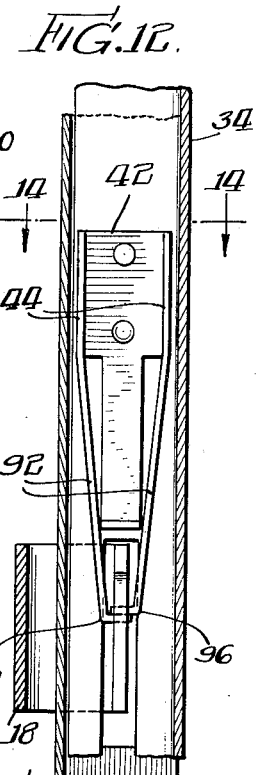
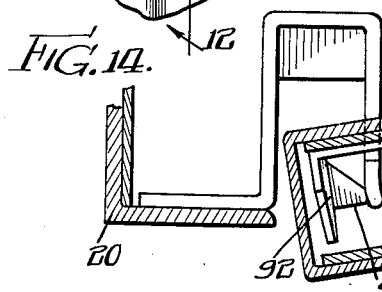
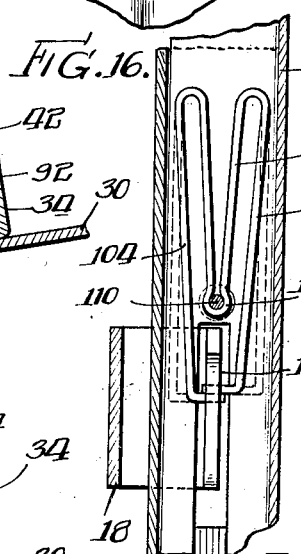
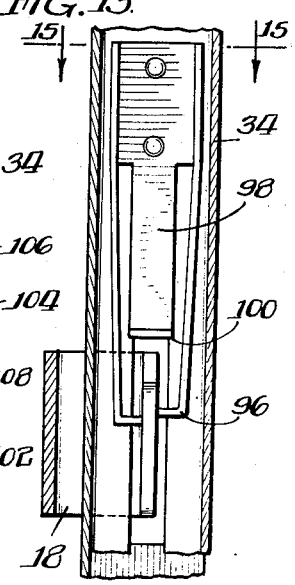
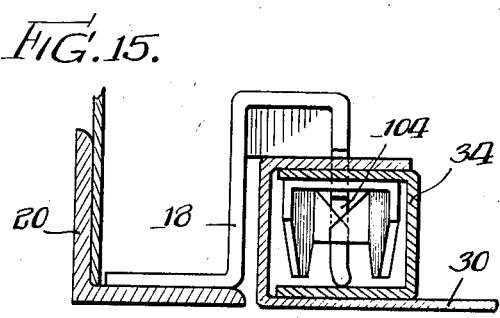
Inventor
John B. O'Connor
By: Cox & Moore attys March 26, 1940.  J. B. O'CONNOR  2,195,223
LOCKING DEVICE
Filed Dec. 12, 1936  4 Sheets-Sheet 4
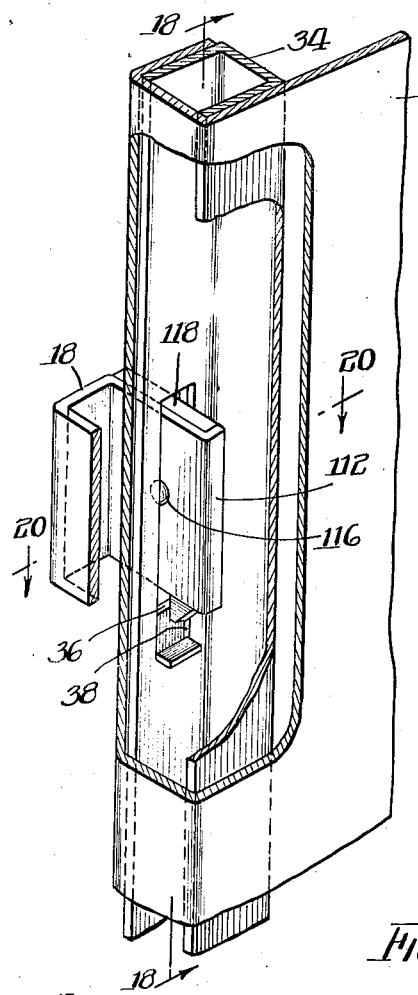
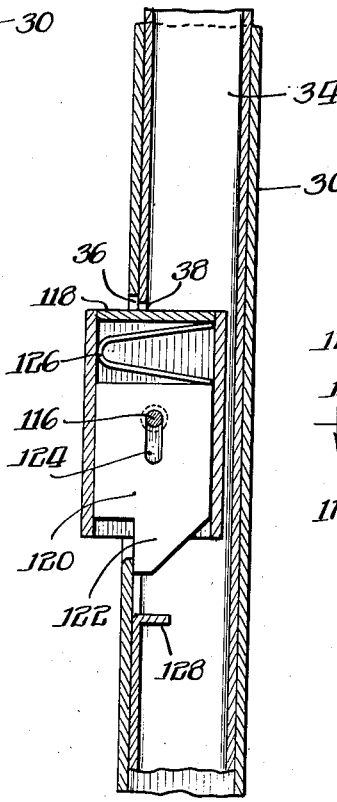
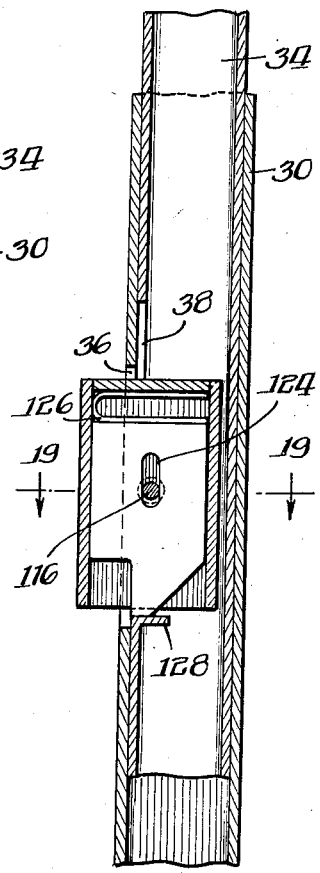
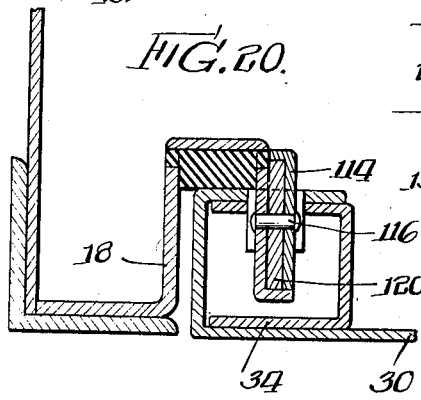
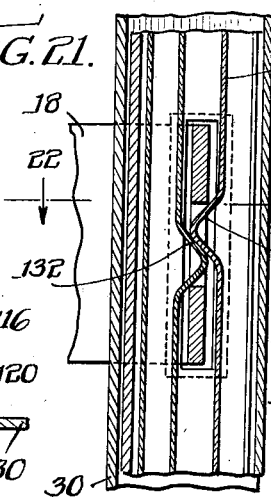
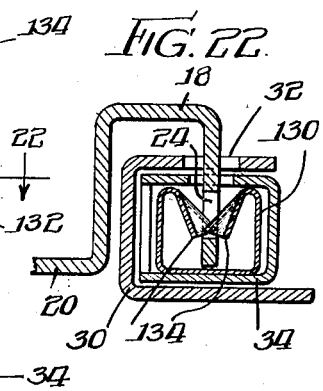
Inventor
John B. O'Connor
By: Cox & Moore attys Patented Mar. 26, 1940

2,195,223

UNITED STATES PATENT OFFICE 2,195,223

LOCKING DEVICE

John B. O'Connor, Aurora, Ill., assignor to Lyon Metal Products, Incorporated, Aurora, Ill., a corporation of Illinois Application December 12, 1936, Serial No. 115,595

10 Claims. (Cl. 292—19)

This invention relates to a locking device and more particularly to a device for locking or latching a locker door.

One of the objects of this invention is to provide an improved construction wherein a longitudinally movable bar is employed to release a latching mechanism.

Another object of this invention is to provide a highly improved structure for automatic latching wherein a door may be latched by merely moving to closed position or wherein the door may be locked before closing, whereupon simply moving to closed position will complete the locking thereof.

It is an additional object of this invention to provide opposed latching mechanisms which, due to their function in opposed directions, are inherently safe against picking or tampering.

It is a further object of this invention to provide opposed spring latching members, the springs of which function in opposite directions to engage the keeper from both sides so that prying or forcing in one direction could not serve to disengage the latches.

A still further object is to provide a spring latching mechanism which will automatically center itself with respect to the keeper.

It is furthermore an object of this invention to provide a spring latch member which may be mounted either on the door, on a latching bar or on the frame and, by the operation of the door projected into keeper engaging position.

Numerous other objects and advantages will be apparent from a consideration of the following specification and drawings which disclose a few devices constructed in accordance with the principles of the present invention and in which, Figure 1 is a perspective view of the improved locker;

Figure 2 is an inside fragmentary perspective view of the locking mechanism;

Figure 3 is a vertical sectional view taken on the line 3—3 of Figure 2;

Figure 4 is a perspective detail view of a locking mechanism with portions of the door broken away;

Figure 5 is a vertical section taken on the line 5—5 of Figure 6;

Figure 6 is a vertical section taken on the line 6—6 of Figure 4;

Figure 7 is a plan section taken on the line 7—7 of Figure 5;

Figure 8 is a plan section taken on the line 8—8 of Figure 4;

Figure 9 is a perspective view of the unlatching member shown in dissembled relationship;

Figure 10 is a perspective fragmentary view of a modified form of latching mechanism shown in latched position;

Figure 11 is a view of the same mechanism as shown in Figure 10;

Figure 12 is a vertical detail section of the latching device shown in Figure 10, taken on the line 12—12;

Figure 13 is a view similar to Figure 12, but showing the elements in the position taken during the entry of the keeper;

Figure 14 is a fragmentary plan sectional view taken on the line 14—14 in Figure 12;

Figure 15 is a fragmentary plan sectional view taken on the line 15—15 in Figure 13;

Figure 16 is a sectional view of a modified form of latching member;

Figure 17 is a perspective fragmentary view of a modified form of latching mechanism, portions of the door being broken away;

Figure 18 is a vertical sectional view taken on the line 18—18 of Figure 17;

Figure 19 is a vertical section taken on the same line as Figure 17, but showing the elements during the process of unlatching;

Figure 20 is a plan sectional view taken on the line 20—20 in Figure 19;

Figure 21 is a vertical section showing an alternative preferred embodiment; and Figure 22 is a plan sectional view taken on the line 22—22 in Figure 21.

The locker 10, which comprises an illustrative embodiment for the purpose of disclosing the present invention, is of generally conventional construction having an opening defined in part by side angle members 12 and 14.

The door 16 is hinged to the angle member 12 in the conventional manner. The angle member 14, forming the opposite jamb, is provided with lugs 18 which extend forwardly into the opening occupied by the door in closed position. The lugs 18 are generally U-shaped and are provided with a flange 20 adapted to be welded, or otherwise secured, to the inner surface of the forward wall of the angle member 14. The outermost forwardly extending portion 22 of the lugs forms a keeper portion and is provided with an aperture or slot 24.

In addition, the inner rearmost portion of the lugs is provided with a stop 26, preferably of rubber or similar resilient material, which is held in position by oppositely protruding portions 28 which register with corresponding apertures in the side portions of the lugs, and serves to absorb the impact of closing or slamming the door, as well as deadening any accompanying sound.

The door 16 is preferably made of sheet metal which, along the free edge thereof, is turned inwardly to form a longitudinally extending flange 30. At a point spaced from the outer surface of the door, this flange is again turned inwardly to form the flange 32 parallel thereto and thus provides a partially tubular enclosure at its margin.

In this enclosure is fitted a channel member 34, the base portion of which occupies the open side of the enclosure formed at the edge of the door and the sides of which bear against the face of the door and the rear parallel flange 32.

The channel member is secured in the position shown in Figures 7 and 8, for instance, in order to complete the tubular enclosure formed at the margin of the door, but is adapted for limited vertical movement by means of indentations in the flange 32 registering with vertically extending slots in the channel member (not shown). Obviously any conventional means may be employed to constrain the channel member in position at the margin of the door and yet permit limited vertical movement.

The rearward door flange 32 is provided with an aperture 36 to permit free entry of the forwardly presented end of the keeper portion 22 and the rearward wall of the channel member is provided with an elongated aperture to form a vertically extending slot 38 to permit free entry of the keeper at any longitudinal position of the channel member. A section is further cut from the rearward wall of the channel member just above this groove as at 40 in order to provide for the mounting of the spring pressed latch mechanism on the rear flange 32 of the door.

The latches are constructed from a single piece of spring metal and are formed generally into a channel section having a rear wall 42, as illustrated in Figure 4, and side walls 44. The rear wall is fastened securely against the flange 32 by means of a pair of machine screws 46 passing through the exterior of the flange and threaded into the rear wall 42.

The forwardly extending wall sections 44 are relieved from the rearward wall at a point just below the fastening means and extend downwardly as two parallel fingers 48. Approximately intermediate of their length, each of these fingers is depressed toward the other to form the latch portions 50 which are so proportioned as to provide a pair of vertically extending edges on the forward side of the fingers which will abut each other in normal latching position when the fingers 48 are in generally parallel position.

The depressed portions extend rearwardly with decreasing depth to form inner sloping surfaces 51, as shown in Fig. 7. The lower end of the fingers is provided with a second pair of depressed portions 52 in which the depressions are of substantially the same depth as those forming the latch portion 50 and which extend in uniform depth across the fingers and maintain the bottom of the fingers in the same general spaced relationship. The depressions 52 are formed at the bottom thereof with oppositely extending fingers 53 which are so bent for a purpose which will hereinafter appear.

It will thus be apparent that normally, as the door is closed, the forwardly extending keeper portion 22 will enter the openings 36 and 38 provided therefor in the flange and channel members, will pass between the latch portions 50 and, upon reaching the position shown in Figures 6 and 8, for instance, the latches will fall into the keeper opening 24 provided therefor.

The mechanism for releasing the latch is attached to the channel member and operates upon vertical longitudinal movement of said member. It comprises a pointed cam surface 54 in the shape of a wedge which is a struck-out portion of a bridge member having rails 56 parallel to the face of the door 16 and being spaced therefrom by inwardly bent legs 58 terminating in flanges 60. A series of rivets 62 secure these flanges rigidly to the forward side of the channel member 34. This structure serves to support the struck-out wedge member 54 in a position below the indented portions 52 at the lower end of the spring fingers 48.

It will thus be apparent that longitudinally upward movement of the channel member within the door flanges will produce corresponding movement of the wedge-shaped member 54 between the lower ends of the fingers, thus causing them to be sprung apart as in Figure 5 and retracting the latch portions reversely from the aperture in the keeper.

Control of the channel member in its longitudinal movement is effected by means of a control handle 64 which is provided with inwardly extending fingers 66 and a downwardly extending locking finger 68. The fingers 66 extend through two slots 70 in the face of the door provided to readily accommodate the fingers in all positions of the limited longitudinal movement of the channel member.

An angle member 72, as shown in Fig. 2, is secured rigidly to the channel member 34 by bending over the extended side 74 and forming a flange 76 at either end thereof which are spot-welded to the back face of the channel member. It is evident, therefore, that the angle member 72 forms a box-like enclosure with the door and the channel member which serves to cover the slots 70 and prevent access to the interior by inserting any instrument through these openings.

The inwardly extending fingers 66 on the control handle 64 are rigidly connected to the angle member 72 by machine screws 78 which pass through the latter and are threaded securely into the fingers. The door handle 80 is secured to the door as by a machine screw and nut 82 passing through a lower flange thereof and at the top by a turned-over tab 84 inserted into a suitable slot in the door. The handle is also provided with a slot 86 at the lower portion thereof to permit passage therethrough of the locking finger 68 on the control handle 64 which is centrally disposed of the door handle 80.

Thus, by merely passing a padlock or other locking member through an aperture 87 in the finger 68, the mechanism will be effectively maintained in locked position. Rubber stops 88 are also fixed at the upper and lower corners of the handle to absorb the impact of lifting or lowering the control handle 64.

In operation, the control handle 64 and the channel member, together with its attached mechanism, will normally be maintained in a lowermost position by gravity whereupon the latches are free to operate. Thus, as the door is closed, the latching surfaces 50 will be sprung outwardly by the keeper, as shown in Figure 7, until they register with the aperture 24 whereupon they will spring into latching position and the door will be locked.

This operation may be carried out even though a padlock or other similar mechanism is first passed through the aperture 87 and the mechanism thus placed in locked condition. When it is desired to permit the doors to open, the locking device must be removed from the aperture 87. Then, by merely lifting the control handle 64 relative to the handle 80, the fingers 66 are caused to move upwardly carrying with them the angle member 72 and the channel member 34 fixed rigidly thereto.

Thus, the wedge-shaped member or cam 54 is caused to be directed between oppositely disposed fingers 53 and between the depressd portions 52 of the spring fingers, forcing them apart and retracting the latch portions 50 oppositely from the keeper.

It will be apparent, therefore, that one of the main advantages of this construction is that a wire or other instrument inserted for the purpose of pressing back the latch or the latch spring, would normally only permit retraction of one latch at a time, while the other latch would, at the same time, continue to engage the keeper and with renewed vigor, since any opposed pressure is relieved. Thus the device is particularly adapted to resist unauthorized tampering.

An alternative structure is disclosed in Figures 10 to 15, wherein the latch mechanism is constructed in channel-shaped form 42 and having side walls 44, but not secured to the door flange; on the other hand, it is secured to the rearward wall of the channel member 34 by rivets 90. The side walls of the channel portion 42 extend downwardly, inwardly relieved from the rear wall of the channel to form fingers or springs 92, which terminate in enlarged portions 94 having inwardly and oppositely disposed latches 96.

It will be evident that the latch portions 96 are disposed one above the other so that, under the inward force of the springs 92, they are forced inwardly in overlapping engagement. The rearward side of the channel portion is separately extended downwardly at 98 and terminates in a forwardly extending flange 100 which serves as a stop for the springs 92 and maintains proper position of the latch fingers 96 when operative to engage the keeper.

The keeper member is here provided with a slot 102 and the finger members with relatively sloping surfaces 103 so that entry of the keeper into the apertures provided in the channel member and rear flange of the door will cause contact of its forward edge with the sloping surfaces 103, spreading the fingers apart until they register with the slot 102 whereupon they spring together, as shown in Figure 15.

In operation of this device, it is not necessary to provide a latch releasing mechanism upon the channel member since, in view of the fact that the latch mechanism is rigidly mounted thereon, the lifting of the control handle 64 and consequently the channel member 34 will bodily lift the latches and their associated mechanism from registration with the slot 102, thus freeing the keeper from the latches.

A further alternative structure is disclosed in Figure 16 in which the springs 104 supporting the latches extend upwardly and then downwardly at 106 in a continuous strip of spring metal. The loop 108 formed thereby surrounds a pin 110 which is positioned between the opposite walls of the channel member 34. Thus, the springs and latches are pivoted upon the pin 110 for arcuate motion thereon limited by the confines of the tubular housing.

It will thus be apparent that the forward edge of the keeper in cooperation with the rearward cam surfaces 103 of the latches will automatically serve to center the latches on the keeper, that is, if one latch surface 103 engages first, the latch mechanism will rotate on its pivot a sufficient distance to cause the other surface 103 to come in contact therewith.

A further alternative embodiment is disclosed in Figures 17 to 20 and comprehends the combination of the spring-pressed latch bolt mounted upon the door jamb. In this form of structure, the lug 18 is turned over to form a flange 112 at its forward edge.

A second L-shaped member having a forwardly extending wall 114 is positioned, as disclosed in Figure 20, by means of a welded pin 116 to form a box-like enclosure having a top wall 118. The latch bolt 120 having a latching portion 122 is provided with a central slot 124 engaging the pin 116 so that limited vertical reciprocation of the latch bolt is permitted. A U-shaped spring 126 normally urges the latch bolt into its lowermost position.

The channel member and rear flange of the door are provided with the usual apertures or cut-away portions 36 and 38. The lower edge of the cut-away portion in the channel wall is provided with a bent-over shoulder 128. As the door is moved into closed position, the lug 18 will present the latching device through the opening 36 whereupon the forwardly inclined edge of the latch will ride up over the lower portion of the opening 36 and, upon reaching closed position, will be projected behind this edge, maintaining the door in closed position.

Here, as in the other structures, in order to release the device it is merely necessary to raise the control handle 64 with its associated channel member whereupon the shoulder 128 will rise upwardly, bearing against the lower edge of and carrying with it the latch bolt 120 until the latter member has reached a position above the lower edge of the aperture 36, as shown in Figure 19. Thus, the door may be readily opened against the sliding friction of the lower end of the latch bolt 122 upon the shoulder 128.

The embodiment shown in Figures 21 and 22 comprises a relatively thin sheet metal channel member 130 having its outer ends formed inwardly to provide curved latching surfaces 132 in the inwardly and longitudinally extending flanges 134. This latching member may be secured by rivets or the like, to the latch control channel member 34.

Thus in operation, the curved latching surfaces 132 will normally engage the aperture 24 in the keeper and effectively latch the door by presentation of their butt end surfaces to the outer wall of the aperture. Release of the latch is accomplished by raising the latch release channel whereupon the latching surfaces will be raised out of the aperture, the latches being spread apart as their upper curved surfaces contact the upper wall of the aperture 24. A slotted keeper may be employed with equal facility.

In all of the structures provided, the latching mechanism is carefully protected against tampering or picking of the lock by full enclosure of the parts or by oppositely disposed resilient members, only one of which may be released at a time by any instrument inserted into the channel 34.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the forms herein described being preferred embodiments for the purpose of illustrating the invention.

Having thus described the invention, what is claimed as new and desired to be secured by Letters Patent is as follows:

1. A latching device for a locker having an opening and a door for said opening, comprising latches oppositely disposed and mounted for resilient action toward each other on said door and adapted normally to engage a keeper in closed position, and a bar mounted on the door and operatively connected with the door control handle for movement to oppositely retract the said latches from the keeper.

2. A latching device for a locker having an opening and a door for said opening, comprising spring-pressed, opposed latches mounted on said door and adapted normally to engage a keeper, extending forwardly into said opening, from opposite sides, a vertically movable release bar adjacent the margin of the door, and means on said bar to retract the latches in opposite directions from the keeper when the bar is moved vertically.

3. A latching device for a locker having an opening and a door for said opening, comprising resilient, opposed latch means mounted on said door and adapted normally to engage a keeper, extending forwardly into said opening from opposite sides, said latch means being elongated and extending longitudinally of said door margin, a release bar movable longitudinally of said door margin, and a cam mounted on said bar and adapted to spread said latches oppositely whereby to release the keeper from engagement thereby.

4. In a latching mechanism for a locker having an opening therein, a door swingable to close the opening and a keeper extending into said opening, said latch comprising a pair of parallel elongated members resiliently separable, latching means on said elongated members for engaging the keeper therebetween, and a control bar on the door and shiftable relatively to said elongated members, said shiftable member being operable from a door handle and having associated therewith a member adapted to separate said elongated member resiliently apart to permit disengagement from the keeper when the bar is shifted.

5. In a latching mechanism for a locker having an opening therein, a door swingable to close the opening and a keeper extending into said opening, said latch comprising a pair of parallel elongated members resiliently separable and arranged longitudinally adjacent the margin of the door, latches on said elongated members for engaging the keeper therebetween, and control means adjacent the margin of the door and shiftable longitudinally of said margin and relative to said elongated members, said control means being operable from a door control handle and comprising means for resiliently separating said elongated members for retracting the latches from the keeper.

6. In a latching mechanism for a locker having an opening therein, a door swingable to close the opening and a keeper extending into said opening, said latch comprising a pair of parallel elongated members resiliently separable, latching means on said elongated members for engaging the keeper therebetween, and control means mounted on the door and controlled by a door control handle for longitudinal shifting movement relative to said elongated members, said keeper being apertured, and said elongated members being permanently associated with the door, whereby said latching means reside adjacent said keeper aperture when the door is in closed position.

7. In a latching mechanism for a locker having an opening therein, a door swingable to close the opening and an apertured keeper extending into said opening, said latch mechanism comprising spaced elongated members mounted on said door to receive the keeper therebetween, said elongated members having opposed latches extending inwardly in position adjacent said keeper aperture when the door is closed for interengaging said latches and said keeper, and means shiftable on said door relative to said elongated members for resiliently separating said members for disengagement of said latches from the keeper.

8. In a latching mechanism for a locker having an opening therein, a door swingable to close the opening and an apertured keeper extending into said opening, said latch mechanism comprising spaced elongated members mounted adjacent the margin of said door and extending longitudinally of said margin, said elongated members having opposed latches extending inwardly in position adjacent said keeper aperture when the door is closed for interengaging said latches and said keeper, and means shiftable longitudinally of said margin of the door and relative to said elongated members for resiliently separating said members for disengagement of said latches from the keeper.

9. In a latching mechanism for a locker having an opening therein, a door swingable to close the opening and having a marginal recess formed adjacent a vertical side edge thereof and an apertured keeper extending into said opening, said latch mechanism comprising a pair of elongated members fixedly mounted within said recess and extending longitudinally of said side margin and being positioned to receive said apertured keeper therebetween, opposed, inwardly extending latch means on said elongated members and residing opposite said aperture when the door is in closed position, a bar associated with said marginal recess for vertical shifting movement relative to said door and said elongated members, and means on said bar engageable between said elongated members for oppositely retracting said members when the bar is shifted for effecting release of the latches from said aperture.

10. In a latching mechanism for a locker having an opening therein, a door swingable to close the opening and a keeper extending into said opening, said latch comprising a pair of parallel elongated members resiliently separable and arranged longitudinally adjacent the margin of the door, latches on said elongated members for engaging the keeper therebetween, and control means adjacent the margin of the door and shiftable longitudinally of said margin and relative to said elongated members, said control means being operable from a door control handle and comprising means for resiliently separating said elongated members for retracting the latches from the keeper, said elongated members being fixed longitudinally on one side of said latches and having a portion longitudinally oppositely spaced for contact with said separating means.

JOHN B. O'CONNOR.